March 4, 1924.
J. M. STEWART
GARDEN CULTIVATOR
Filed Aug. 3 1922
1,486,053
2 Sheets-Sheet 1
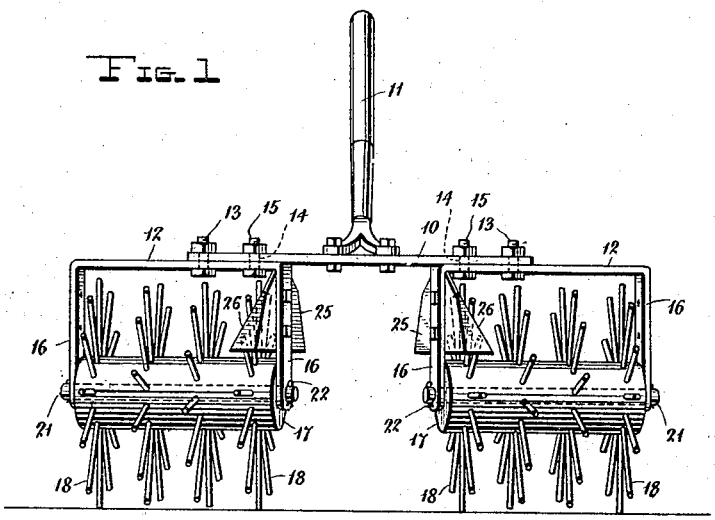
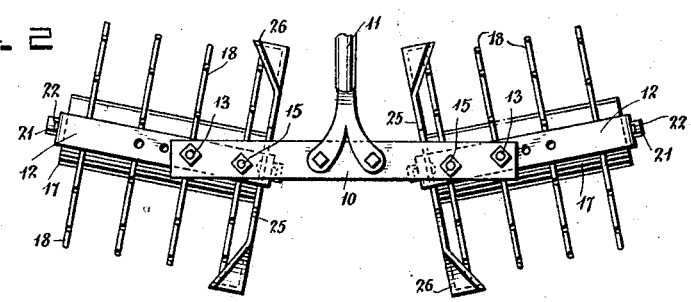
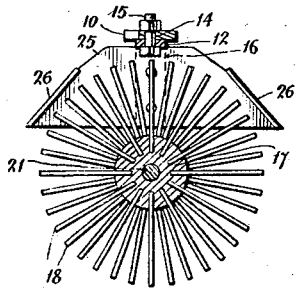
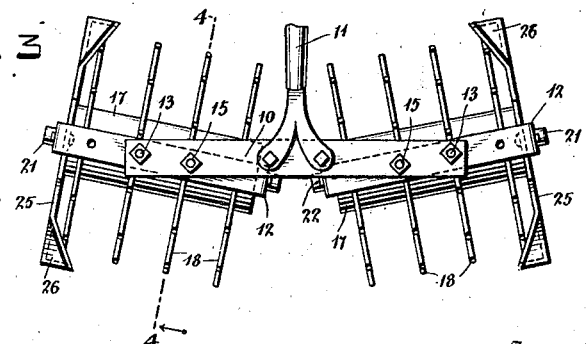
Inventor
Jonathan M. Stewart,
By
Attorney Patented Mar. 4, 1924.

1,486,053

UNITED STATES PATENT OFFICE.

JONATHAN M. STEWART, OF CANTON, OHIO.

GARDEN CULTIVATOR.

Application filed August 3, 1922. Serial No. 579,420.

*To all whom it may concern:*

Be it known that I, JONATHAN M. STEWART, a citizen of the United States, residing at Canton, in the county of Stark and State of Ohio, have invented new and useful Improvements in Garden Cultivators, of which the following is a specification.

This invention relates to a cultivator and is especially adapted for use in garden cultivating.

Objects of the invention are to provide a cultivator which will effectively pulverize the ground and which may be adapted to various circumstances and fill various needs of a gardener.

More specifically the invention has for its objects to provide a cultivator which may be adjusted to straddle the growing plants in the early stages of their development and cultivate simultaneously on both sides of the row of plants, and which may also be adjusted for cultivating between the rows when the plants have become more mature.

Another object is to so construct the device that it may be adapted to rows of various widths and to be used between rows variously spaced apart.

In the drawings:

Fig. 1 is a rear elevation of one form of my device, showing a pair of rollers having radially extending spikes arranged in a plurality of spaced whirls.

Fig. 2 is a plan view of the same, and

Fig. 3 is a plan view showing a different position of adjustment of the rollers from that shown in Figures 1 and 2.

Fig. 4 is a section through one of the rolls showing the position of the fenders to the spikes.

Fig. 5 is a plan view of a somewhat different form of my device in which the whirls of spikes are arranged on separate hubs carried by an axle.

Fig. 6 is a section on the line 6—6 of Figure 5, and

Fig. 7 is an adaptation of my device to the use of a single spike carrying unit.

Referring to the drawings in detail, 10 designates a cross bar to the centre of which the handle 11 is secured. Pivoted to the ends of the bar 10 are cultivator carrying brackets 12, said brackets being eccentrically connected to the bar 10 by means of bolts 13, passing through aligned apertures in the cross bar and brackets respectively so that when the brackets are turned to one position, their innermost ends will be spaced a considerable distance apart, adapting the device to straddle a row of growing vegetables and when turned on their pivots 180° the innermost ends will be spaced only a slight distance apart and the distance between the outer ends will be such that the cultivator may readily pass between the rows of growing vegetables.

In addition to the aperture in the bracket for receiving the bolt 13, other apertures are provided and an additional aperture is also provided on the cross bar at 14 into alignment with which the last named apertures on the bracket 12 are adapted to be brought. When in such alignment a bolt 15 may be passed therethrough, securing the bracket in its adjusted position.

It will be noted from Figure 3 of the drawings that the line between the pairs of apertures at the ends of the bar 10 are at angles to the longitudinal edge of the bar, thereby giving the cultivators a staggered relation one to the other for a purpose which will hereinafter appear.

The cultivator members are carried by the lower ends of the arms 16 of the brackets and as shown in Figures 1 to 4 inclusive, consist of cylindrical members 14 preferably of wood from which extend in a radial direction the spikes 18, said spikes being arranged preferably in whirls spaced apart longitudinally of the cylinders.

In this form of my device the spikes may be driven into the wooden cylinder and may be replaced when they become damaged and the cylinder may be demountably carried between the bracket arms 16 by an axle 21, secured in the bracket arms by cotter pins 22 or the like. In the form of my device as shown in Figures 5, 6 and 7 the spikes 19 are formed integral with hubs or rollers 20 which may also be carried by the axle 21, the cylinder and the hubs being interchangeable at will.

Secured to one end of each gang of cultivator spikes and preferably to the bracket arms are fenders 25 comprising sheets of metal or other suitable material having flaps 26 at the ends bent over the adjacent whirl of spikes. The fenders at their ends are angular in shape, thereby readily passing under the leaves of the plants and guiding them upward over the spikes and thereby preventing entanglement of the leaves therewith.

In operation the cultivator as arranged in Figures 1, 2 and 5 may be used to straddle a row of vegetables in early stages of growth, or vegetables which do not grow to a great height. It will be noted that in these figures, fenders are shown as turned inwardly so as to protect the vegetables passing between the rollers. It will also be noted that with the cultivator set at the angles as illustrated when the cultivator is drawn toward the operator, the spikes will dig into the ground and there will be a shearing thrust outwardly and the earth will tend to be thrown outwardly. When the cultivator is moved in the opposite direction, the thrust will be also reversed and the tendency will be to throw the earth toward the center. In this manner the dirt will be agitated and thoroughly pulverized and obnoxious growths killed.

When it is desired to cultivate between rows the cultivator gangs are reversed by swinging the brackets upon the pivot 13 and the fenders are thus brought to a position at the sides of the cultivators, again bringing the fenders adjacent the rows of growing vegetables. In reversing, the nuts on the bolts 13 are loosened and the bolts at 15 are removed, whereupon the bracket 12 is free to be revolved on the bolt 13 as a pivot. When in the new position the bolt 15 may be reinserted whereby the bracket will be held in its adjusted position. When it is desired to cultivate growths, the rows of which are quite close together, the handle 11 may be removed from the bar and secured to one of the brackets 12, as shown in Figure 7, whereby a cultivator of greatly diminished width may be obtained. Also dummy hubs may be used in place of the end hubs in the device as shown in Figure 7, leaving one or two whirls of spikes thereby diminishing the width of the cultivator.

What is claimed as new is:—

1. A cultivator comprising a cross bar, brackets eccentrically pivoted at each end of the bar, rotatable members secured to said brackets having radially extending spikes thereon, said brackets being adapted when turned on their pivots substantially a half revolution to bring the rotatable members close together or to space them a distance apart sufficient to straddle a row of growing plants and means for holding the brackets in their adjusted position.

2. In a cultivator, a cross bar, a handle centrally secured to said bar, roller carrying brackets eccentrically and pivotally secured to the ends of said bar, a fender on one side of each bracket extending beyond the roller, and means for securing the brackets against angular movement with said fenders both between or both outside of said rollers.

3. In a cultivator, a cross bar with a handle centrally attached thereto, roller carrying brackets pivoted eccentrically to the ends of said bar and adapted to be rotated through substantially 180° on said pivots to bring certain ends of the brackets into close proximity to each other, or to bring the opposite ends adjacent each other and spaced apart a distance sufficient to straddle a row of growing plants, and means for holding the brackets in their positions of adjustment.

4. In a cultivator, a cross bar with a handle centrally attached thereto, roller carrying brackets pivoted eccentrically to the ends of said bar each having fenders at one end, said brackets being adapted to be rotated through substantially 180° on said pivots to bring the fender carrying ends into position adjacent each other and spaced apart a distance sufficient to straddle a row of growing plants, or to a position with the fender carrying ends outwardly and the opposite ends adjacent and in close proximity to each other, and means for holding the brackets in their various positions of adjustment.

5. In a cultivator, a cross bar having a handle centrally and detachably attached thereto, roller carrying brackets adapted to be adjustably and detachably attached to the ends of said bar or to said handle, whereby a single or a double roller cultivator may be formed at will.

6. In a cultivator, a cross bar having apertures on each side of the transverse central line and apertures adjacent the ends, a handle having spaced members provided with apertures adapted to align with the first named apertures in said bar, bolts adapted to fit said apertures for securing the handle and bar together, roller carrying brackets having apertures therein adapted to align with the apertures in the ends of said bars and bolts for connecting the brackets to said bar.

7. In a cultivator, a bracket, means for connecting said bracket with a handle, said bracket having arms lying in parallelism to each other, an axle carried by said arms, and a plurality of rollers removably mounted on said axle, said rollers having spikes extending radially therefrom in spaced whirls.

In testimony whereof I have hereunto set my hand in presence of two subscribing witnesses.

JONATHAN M. STEWART.

Witnesses:
CHAS. R. RAEDEL,
A. T. DENNIS.